US007092700B2

(12) United States Patent
Daurensan

(10) Patent No.: US 7,092,700 B2
(45) Date of Patent: Aug. 15, 2006

(54) METHOD AND A DEVICE FOR SIGNALING A CALL OR A MESSAGE TO ITS ADDRESSEE

(75) Inventor: Véronique Daurensan, Antony (FR)

(73) Assignee: Alcatel, Paris (FR)

(*) Notice: Subject to any disclaimer, the term of this patent is extended or adjusted under 35 U.S.C. 154(b) by 263 days.

(21) Appl. No.: 10/072,947

(22) Filed: Feb. 12, 2002

(65) Prior Publication Data

US 2002/0160819 A1 Oct. 31, 2002

(30) Foreign Application Priority Data

Feb. 22, 2001 (FR) .................................. 01 02389

(51) Int. Cl.
*H04M 3/42* (2006.01)
(52) U.S. Cl. ................. 455/417; 455/412.2; 455/414.1
(58) Field of Classification Search ................ 455/567, 455/415, 403, 401, 414.1, 417, 566, 412.1, 455/412.2; 379/67.1, 69, 211.2, 211.1
See application file for complete search history.

(56) References Cited

U.S. PATENT DOCUMENTS

| 5,557,605 | A | * | 9/1996 | Grube et al. ................. 455/415 |
| 5,870,684 | A | | 2/1999 | Hoashi et al. |
| 5,905,794 | A | * | 5/1999 | Gunn et al. .................. 379/382 |
| 5,995,603 | A | * | 11/1999 | Anderson ............... 379/142.05 |
| 6,018,671 | A | * | 1/2000 | Bremer ........................ 455/567 |
| 6,198,812 | B1 | * | 3/2001 | Weber .................... 379/142.04 |
| 6,226,536 | B1 | * | 5/2001 | Miyashita .................... 455/567 |
| 6,334,053 | B1 | * | 12/2001 | Halonen .................. 455/412.1 |
| 6,353,663 | B1 | * | 3/2002 | Stevens et al. ......... 379/114.22 |
| 6,549,619 | B1 | * | 4/2003 | Bell et al. .............. 379/210.02 |
| 6,618,473 | B1 | * | 9/2003 | Davis ..................... 379/142.05 |
| 6,748,068 | B1 | * | 6/2004 | Walsh et al. ........... 379/142.03 |
| 6,842,622 | B1 | * | 1/2005 | Peters et al. ................. 455/458 |
| 2001/0014616 | A1 | * | 8/2001 | Matsuda et al. ............. 455/567 |
| 2003/0032415 | A1 | * | 2/2003 | Cho et al. .................... 455/415 |
| 2003/0078081 | A1 | * | 4/2003 | Schmier ...................... 455/567 |
| 2003/0096639 | A1 | * | 5/2003 | Cluff et al. .................. 455/567 |
| 2004/0176083 | A1 | * | 9/2004 | Shiao et al. ................. 455/417 |

FOREIGN PATENT DOCUMENTS

GB 2 324 933 A 11/1998
WO WO 98/05151 2/1998

* cited by examiner

*Primary Examiner*—Sonny Trinh
(74) *Attorney, Agent, or Firm*—Sughrue Mion, PLLC

(57) ABSTRACT

In a method of signaling an incoming call or electronic message from a given sender to the user of a receiver terminal to whom the call or message is addressed, the receiver terminal identifies the sender, allows for at least one changeable or predetermined parameter relating to the sender, and dynamically selects at least one signaling mode and/or at least one signaling device available in the receiver terminal as a function of the state of the parameter or parameters linked to the sender.

15 Claims, 1 Drawing Sheet

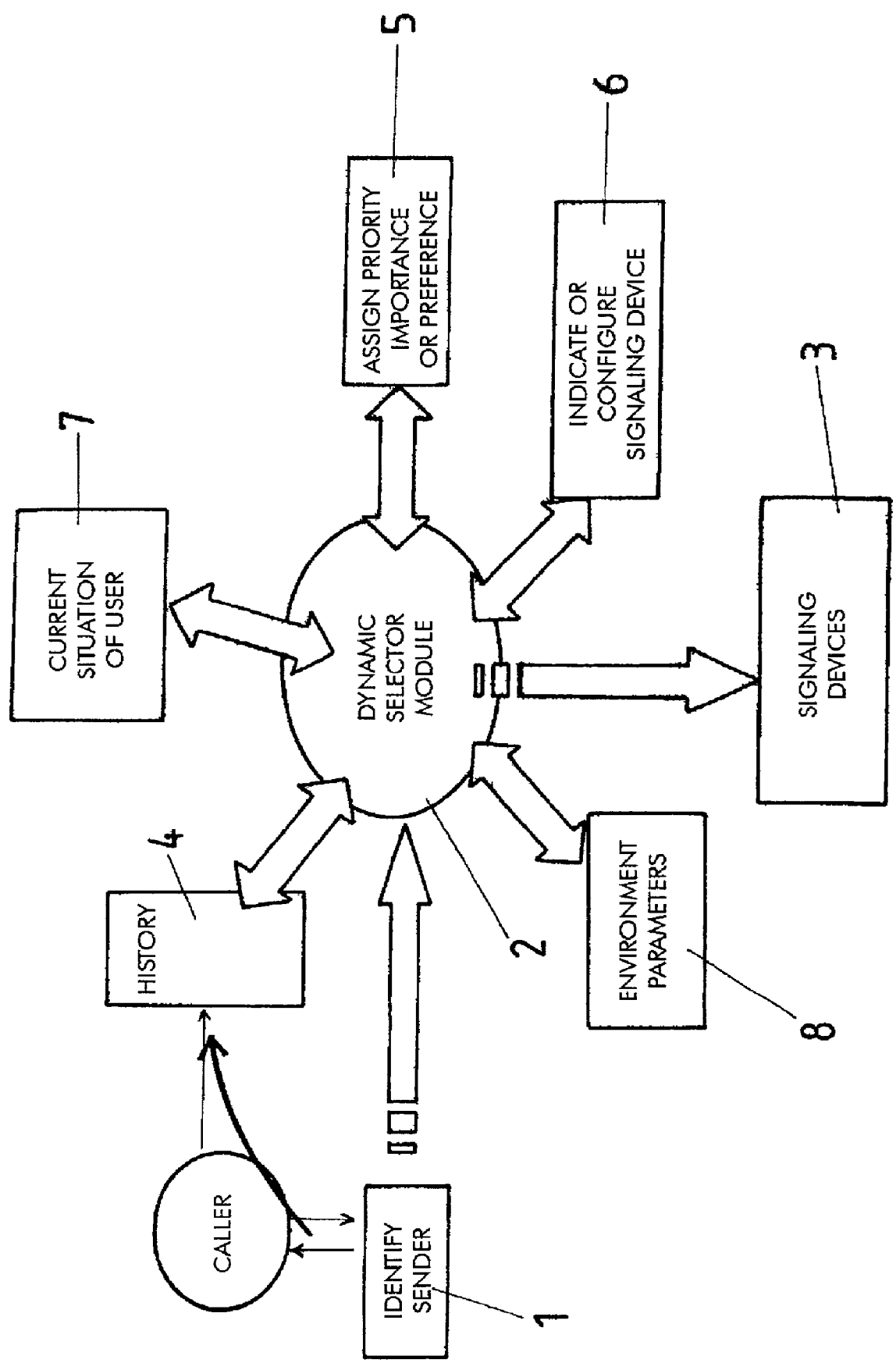

METHOD AND A DEVICE FOR SIGNALING A CALL OR A MESSAGE TO ITS ADDRESSEE

CROSS-REFERENCE TO RELATED APPLICATIONS

This application is based on French Patent Application No. 01 02 389 filed Feb. 22, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates to communications, especially telecommunications, in particular services in relation to man-machine interfaces (MMI) associated with communication terminals, and consists in a method and a device for signaling a call or a message to the addressee.

2. Description of the Prior Art

Programming the mode of signaling an incoming call to the addressee as a function of their situation is already known in the art, in particular in relation to mobile radio communication terminals, especially mobile or cellular telephones.

Thus a mobile telephone can be programmed to alert the addressee by vibrating if the addressee has selected a discreet signaling mode (because the addressee is attending a meeting or a concert or the like), or by means of a single sound, a repeated sound or a melody if the addressee has requested a signaling mode generating a more readily perceptible warning (because the addressee is in a place requiring no particular discretion).

However, programming the mode of signaling a call or a message on the basis of a single criterion in this way is very inflexible and cannot flexibly filter incoming calls and/or messages that would authorize adapting the intensity of attracting the attention of the addressee to the importance to be given to said incoming calls or messages, at least partially as a function of previous programming by the addressee.

One particular object of the present invention is to alleviate this limitation.

SUMMARY OF THE INVENTION

To this end, the present invention provides a method of signaling an incoming call or electronic message from a given sender to the user of a receiver terminal to whom the call or message is addressed, in which method the receiver terminal performs the following steps:

identifying the sender;
allowing for at least one changeable or predetermined parameter relating to the sender; and
dynamically selecting at least one signaling mode and/or at least one signaling device available in the receiver terminal as a function of the state of the parameter or parameters linked to the sender.

To enhance even further the adaptability and selectivity of the method according to the invention, the dynamic selection step can also allow for another parameter programmed by the user and/or the state of a parameter related to the environment or to the status of the receiver terminal.

According to a first feature of the invention, for each new call or message, one changeable parameter relating to the sender that is allowed for corresponds to the number of earlier calls or messages from the same sender not answered immediately or later by the addressee, the parameter being modified, for example incremented, if the new call or message is not answered, where applicable subject to corresponding authorization by the user.

Another changeable parameter relating to the sender that can also be allowed for in the case of an electronic message corresponds to the degree of importance attached to the message.

According to another feature of the invention, the predetermined parameter relating to the sender that is allowed for corresponds to the identity of the sender.

The parameter or parameters programmed by the user of the receiver terminal are advantageously chosen from the group consisting of a specific degree of priority or importance attached to different predefined senders, the current situation or status of the user, and preferences of the user in terms of available signaling and warning modes and/or devices.

For example, different priorities can be defined by authorizing for certain senders only one modification of the importance and the level of warning, in particular one increase therein, either continuously or in discrete steps, as a function of the increasing number of calls or messages from the senders concerned to which the addressee has not responded.

Other senders known to the user can be assigned a fixed low or high importance or level of warning as a function of the importance assigned by said user to each of said senders.

For any further senders considered to have no priority, only the lack of response is taken into account, and not the number of calls or messages with no response. It follows that these senders are assigned only two states: awaiting a response (including definition of a signaling device and mode) or not awaiting a response.

Furthermore, the parameter or parameters that are associated with the environment or the status of the receiver terminal and are used to modify the mode of use of the selected signaling device or devices can be chosen from the group consisting of the background noise level, the background brightness level, the remaining battery charge of the receiver terminal, and the functional availability of the signaling devices.

In one preferred embodiment of the invention, each time a new incoming call or message is received, at least one signaling mode and/or at least one signaling device or a combination of signaling modes and/or devices are determined, possibly in conjunction with respective degrees of intensity of their use, by selecting the modes and/or devices on the basis of one or more graduated scales, for example scales of effectiveness of warning, each of the scales being associated with a current situation and/or status of the user programmed by the user, and as a function of a value or a level of warning calculated from changeable or non-changeable parameters associated with the sender.

As an alternative to the above, each time a new incoming call or message is received, a signaling mode and/or a signaling device can be selected after, on the one hand, analyzing the different types of parameters that are relevant and, on the other hand, allowing for their relative importance as predefined by the user, and, finally, verifying the existence of multiparameter selection configurations preprogrammed by the user and applying to the incoming call or message.

It is clear from the foregoing that the present invention provides the user with different ways of being alerted to a telephone call or to a received message or electronic mail.

The device used to signal the call or reception of the message, and its mode of use, can therefore differ as a function of, on the one hand, input parameters relating to the sender, for example the identity of the sender, the number of unanswered calls or messages from said sender to which the addressee has not responded, and, on the other hand, parameters programmed by the user, including their situation at the time of the call or reception of the message (at a meeting, at home, at work, "do not disturb", travelling, etc.), and, finally, environmental or circumstantial parameters, if any.

The present invention also provides a device for signaling an incoming call or an incoming electronic message from a caller using a given sender terminal to the user of the telecommunication terminal, to whom the call or message is addressed, which terminal includes, on the one hand, means for identifying the number or the address of the sender and, on the other hand, a module for dynamically selecting at least one signaling mode and/or device available in the telecommunication terminal as a function of the state of at least one changeable or predetermined parameter relating to the sender and allowed for by the module, where applicable, in conjunction with the state of at least one parameter programmed by the user and/or the state of at least one parameter relating to the environment or to the status of the telecommunication terminal.

According to one feature of the invention, the device can further include a history file for storing automatically, for each call or message, the number or the address of the sender and either the number of successive calls or messages sent by each of the senders which the user of the telecommunication terminal has not answered or a simple indication that the senders are awaiting an answer, the history file being updated automatically on each new call or message by incrementing the variable indicating the number of unanswered previous calls or messages from the sender, by activating an indicator that the sender concerned is awaiting a response, or by creating a new location in the history file for storing the number or the address of the sender and the corresponding variable or indicator.

The dynamic selector module is adapted, on each new call or each new reception of an electronic message, and after allowing for the number or the address of the sender, to read the value of the variable or the state of the indicator assigned to the sender, the information constituting a first changeable parameter relating to the sender.

According to another feature of the invention, the device further includes a file for assigning degrees of priority or importance specific to given senders, a file for indicating and configuring the signaling device or devices as a function of values and/or states of parameters allowed for by the dynamic selector module, a file or a programmable variable indicating the current situation or status of the user, and a file containing parameters relating to the environment or to the status of the mobile terminal, the files and/or the variable being consulted, together with the history file, and their contents being used by the dynamic selector module to control the signaling means to generate a warning signal or message appropriate for the user.

Thus the present invention provides a dynamic and configurable man/machine multimedia communication interface.

In particular, it finds an application as an interface between a mobile telephone and its owner or user, authorizing multiparameter selection of a device and a mode for signaling or warning of a call or a message in a manner that allows for previous facts (history file), the current situation of the user, and choices or priorities preprogrammed by the user (hierarchy of identified senders, priority of some senders as a function of the situation of the user, etc.).

An evaluation of the various parameters cited above defines an importance for the call in progress or the message that has just arrived and a correlative warning level, whose interpretation, through the intermediary of correspondence tables (signaling device configuration and indication files), a preprogrammed table being assigned to each possible situation of the user, determines the signaling device and mode.

Finally, the mode of use of the selected signaling device can be modified as a function of routine characteristics of the environment of the receiver terminal (for example measured by suitable sensors or deduced from data entered by the user), stored in a file or in predefined fields.

As a function of the receiver terminal type, a larger or smaller number of signaling devices of more or less varied forms can be made available.

If the receiver terminal is a mobile terminal such as a mobile telephone, the aforementioned devices are generally three types:
  vibrator (vibrations varying in intensity, sequencing and duration);
  audio generator (beep, single sound, prolonged sound or melody, pre-recorded or synthesized message, with adjustable sound levels);
  display or graphical screen (display of number, address or identity of sender continuously or intermittently, with a varying graphical representation (color, position on the screen, size of display, etc.); display of a photograph of the caller or a symbol indicating recognition of the caller).

BRIEF DESCRIPTION OF THE DRAWING

The invention will be better understood from the following description, which refers to a preferred embodiment provided by way of non-limiting example and explained with reference to the accompanying diagrammatic drawing, the single FIGURE in which is a block diagram of one embodiment of a signaling system according to the invention implementing the method previously described.

DETAILED DESCRIPTION OF THE PREFERRED EMBODIMENT

One embodiment of a method according to the invention applied to a mobile telephone is described in detail hereinafter with the aid of the accompanying drawing.

If the mobile telephone receives a new call or a new message or electronic mail, the identity of the sender (the person calling or sending the mail) is first determined by sender identification means 1 or by an appropriate operation carried out by the dynamic selector module 2.

The history file 4 is then modified by incrementing a variable N_call assigned to said sender and whose value corresponds to the number of calls and/or messages from said sender to which the user/addressee has not responded.

One possible structure of this kind of history file is indicated in tabular form below.

| Input data | Number of unanswered messages or calls (N_call) |
|---|---|
| 01.40.96.95.xx | 10 |
| Toto@xxx.fr | 2 |
| Etc. | Etc. |

The variable N_call is reset to 0, if the user takes the call or responds to the sender by calling back later or sending a return message.

It is advantageous if the user can consult the history file 4. The user can then tell who attempted to contact him, for example while he was in a situation corresponding to a low level of warning and was not able to take note of the call of the message received during this period (either because his attention was not attracted sufficiently strongly, or because he intentionally decided not to).

When the number or the electronic address of the sender has been sent to the selector module 2, that module begins a processing phase by first consulting the history file 4 (to find out the number of calls or messages from this sender that have not been answered), and then consults the file 7 indicating the current situation or status of the user as a function of the latest information programmed by the user.

It must be noted that the user can of course define a new situation or a new status.

The selector module 2 then consults the file 5 for assigning degrees of priority or importance or preference to given senders, corresponding to the current situation or status of the user.

The file 5 indicates for which senders it is necessary to take account of the number of calls or messages that have not been answered, with corresponding adaptation of device and mode for signaling a new call or a new message to the user.

That adaptation can consist of selecting signaling devices and of modes of using providing an increasingly effective warning as a function of the increasing number of unanswered calls or messages.

This distinction between the aforementioned two types of senders can be defined by a Boolean indicator To_increment, for example.

As a function of the state (TRUE or FALSE) of this indicator, the sender concerned is assigned a variable Nb_limit indicating the threshold for passing from one degree or level of warning to the next (To_increment=TRUE) or a field default_Ev indicating directly and in a predefined (static) manner the degree of warning assigned in fixed manner to that sender, regardless of the number of unanswered calls or messages (To_increment=FALSE).

One possible structure of the file 5 is indicated in tabular form below:

| Sender | To_increment | Nb_limit or Ev |
|---|---|---|
| 04.66.77.84.xx | TRUE | 5 |
| 01.69.63.24.xx | TRUE | 10 |
| 01.46.65.76.xx | FALSE | 0 |
| titi@xxx.fr | FALSE | 1 |

On the basis of the above information, the selector module 2 is able to calculate the degree of warning Ev for the current call or message. For example, the calculation can be based on the following sequence of algorithm operations:

if To_increment=TRUE, then Ev=E(N_call/Nb_limit);
if not Ev=default_Ev.

After calculating Ev, the selector module 2 consults the file 6 for indicating and configuring the signaling device or devices corresponding to the current status of the user, to determine the signaling device 3 to be used and the associated configuration characteristics (volume, repetition, color, position, etc.).

After consulting this file, the selector module 2 knows exactly how to alert the user.

However, before activating the selected signaling device 3, said module 2 can consult a file 8 containing parameters related to the environment and, as a function of the information read there, modify the use characteristics of the selected signaling device.

Consequently, the user is alerted by the signaling device and the mode of warning best suited to the routine circumstances defined by the parameters cited above.

The invention therefore improves the user friendliness of a receiver terminal by reducing the drawbacks associated with modes of warning that are too disturbing, in particular as a function of the user's situation, but without simultaneously neglecting an efficient warning mode in the case of a call or a message that might be important or urgent (for example a call or message that is repeated frequently).

The invention also automates call filtering, limiting the intervention required of the user. Filtering can be flexibly adapted to different circumstances and situations, taking account of a greater or lesser number of parameters relating to the sender or programmed by the user.

In addition, it should be noted that the signaling method and system according to the invention can be used in different units forming part of a communication network.

Thus the invention also relates, on the one hand, to a mobile radio communication terminal suitable for connection to a communication network and, on the other hand, to an exchange or similar communication equipment unit, characterized in that they include a signaling system and use a signaling method as described hereinabove.

Finally, the invention also relates to a communication network including a network controller and a plurality of base stations, characterized in that said network controller includes a signaling system and uses a signaling method as described previously.

Of course, the invention is not limited to the embodiment described and shown in the accompanying drawing, which can be modified, in particular with regard to the composition of its various component parts or by substituting technical equivalents, without departing from the scope of protection of the invention.

The invention claimed is:

1. A method of signaling an incoming call or electronic message from a given sender to the user of a receiver terminal to whom said call or message is addressed, in which method said receiver terminal performs the following steps:
   identifying the sender;
   allowing for at least one changeable or predetermined parameter relating to said sender; and
   dynamically selecting at least one signaling mode and/or at least one signaling device available in said receiver terminal as a function of the state of said at least one parameter relating to the sender, and at least one of another parameter programmed by said user and a state of a parameter related to an environment or a status of the receiving terminal.

2. The method claimed in claim 1, wherein said another parameter is related to one of an environment and status of said receiver terminal.

3. The method claimed in claim 2 wherein said parameters programmed by said user of said receiver terminal are chosen from the group consisting of a specific degree of priority or importance attached to different predefined senders, the current situation or status of said user, and preferences of said user in terms of available signaling and warning modes and/or devices.

4. The method claimed in claim 2 wherein said parameters that are associated with the environment or the status of said receiver terminal and are used to modify a mode of use of the selected at least one signaling device, are chosen from the group consisting of the background noise level, the background brightness level, the remaining battery charge of the receiver terminal, and the functional availability of the at least one signaling devices.

5. The method claimed in claim 1 wherein, for each new call or message, one changeable parameter relating to said sender that is allowed for corresponds to the number of earlier calls or messages from the same sender not answered by the addressee, said one changeable parameter being modified.

6. The method claimed in claim 5, wherein said changeable parameter is incremented, if said new call or message is not answered.

7. The method claimed in claim 1, wherein one changeable parameter relating to the sender that is allowed for in the case of an electronic message corresponds to a degree of importance attached to said message.

8. The method claimed in claim 1 wherein said predetermined parameter relating to said sender corresponds to an identity of said sender.

9. The method claimed in claim 1 wherein, each time a new incoming call or message is received, a signaling mode and/or a signaling device are selected after either analyzing the different types of parameters that are relevant or allowing for their relative importance as predefined by the user, and verifying the existence of multiparameter selection configurations preprogrammed by said user and applying to said incoming call or message.

10. A method of signaling an incoming call or electronic message from a given sender to the user of a receiver terminal to whom said call or message is addressed, in which method said receiver terminal performs the following steps:
    identifying the sender;
    allowing for at least one changeable or predetermined parameter relating to said sender; and
    dynamically selecting at least one signaling mode and/or at least one signaling device available in said receiver terminal as a function of the state of said at least one parameter relating to the sender,
    wherein, each time a new incoming call or message is received, at least one signaling mode and/or at least one signaling device or a combination of signaling modes and/or devices are determined, in conjunction with respective degrees of intensity of their use, by selecting said modes and/or devices on the basis of one or more graduated scales.

11. A telecommunication terminal adapted to be connected to a communication network and including a device for signaling an incoming call or an incoming electronic message from a caller using a given sender terminal to the user of said telecommunication terminal, to whom said call or message is addressed, said terminal includes means for identifying the number or the address of said sender and a module for dynamically selecting at least one signaling mode and device available in said telecommunication terminal as a function of the state of at least one changeable or predetermined parameter relating to said sender and allowed for by said module, in conjunction with at least one of the state of at least one parameter programmed by said user and the state of at least one parameter relating to the environment or to the status of said telecommunication terminal.

12. The telecommunication terminal claimed in claim 11, further including a history file for storing automatically, for each call or message, a first number or the address of said sender and either a second number of successive calls or messages sent by each of said senders which the user of the telecommunication terminal has not answered or a simple indication that said senders are awaiting an answer, said history file being updated automatically on each new call or message at least by creating a new location in said history file for storing the number or the address of said sender and the corresponding variable or indicator.

13. The terminal claimed in claim 12 wherein said dynamic selector module is adapted, after allowing for sail first number or said address of said sender, to read the value of said variable or the state of said indicator assigned to said sender, said information constituting a first changeable parameter relating to said sender.

14. A telecommunication terminal adapted to be connected to a communication network and including a device for signaling an incoming call or an incoming electronic message from a caller using a given sender terminal to the user of said telecommunication terminal, to whom said call or message is addressed, said terminal includes either means for identifying the number or the address of said sender or a module for dynamically selecting at least one signaling mode and/or device available in said telecommunication terminal as a function of the state of at least one changeable or predetermined parameter relating to said sender and allowed for by said module, in conjunction with the state of at least one parameter programmed by said user and/or the state of at least one parameter relating to the environment or to the status of said telecommunication terminal, said telecommunication terminal further including a file for assigning degrees of priority or importance specific to given senders, a file for indicating and configuring said signaling device or devices as a function of values and/or states of parameters allowed for by said dynamic selector module, a file or a programmable variable indicating the current situation or status of said user, and a file containing parameters relating to the environment or to the status of said mobile terminal, said files and/or said variable being consulted, together with said history file, and their contents being used by said dynamic selector module to control said signaling means to generate a warning signal or message appropriate for said user.

15. A method of signaling an incoming call or electronic message from a given sender to the user of a receiver terminal to whom said call or message is addressed, in which method said receiver terminal performs the following steps:
    identifying the sender;
    allowing for at least one changeable or predetermined parameter relating to said sender; and
    dynamically selecting at least one signaling mode and/or at least one signaling device available in said receiver terminal as a function of the state of said at least one parameter relating to the sender,
    wherein, each time a new incoming call or message is received, at least one signaling mode and/or at least one signaling device or a combination of signaling modes and/or devices are determined, in conjunction with respective degrees of intensity of their use, by selecting said modes and/or devices on the basis of one or more graduated scales, and
    wherein said one or more graduated scales are scales of effectiveness of warning, each of said scales being associated with at least one of a current situation and status of said user, wherein said status is programmed by said user, and said one or more graduated scales are a function of one of a value and a level of warning calculated from one of a changeable parameter and a non-changeable parameter associated with said sender.

* * * * *